US009717046B2

(12) United States Patent
Jeanne et al.

(10) Patent No.: US 9,717,046 B2
(45) Date of Patent: Jul. 25, 2017

(54) LOW POWER CONSUMPTION MODE FOR WLAN ACCESS POINT (71) Applicant: THOMSON LICENSING, Issy de Moulineaux (FR)

(72) Inventors: Ludovic Jeanne, Montreuil sur Ille (FR); Patrick Fontaine, Rennes (FR); Philippe Chambelin (73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 14/411,545

(22) PCT Filed: Jun. 25, 2013

(86) PCT No.: PCT/EP2013/063214
§ 371 (c)(1),
(2) Date: Dec. 29, 2014

(87) PCT Pub. No.: WO2014/001294
PCT Pub. Date: Jan. 3, 2014

(65) Prior Publication Data
US 2015/0156715 A1 Jun. 4, 2015

(30) Foreign Application Priority Data

Jun. 29, 2012 (FR) ...................................... 12 56234

(51) Int. Cl.
G08C 17/00 (2006.01)
H04W 52/02 (2009.01)
(Continued)

(52) U.S. Cl.
CPC ....... *H04W 52/0206* (2013.01); *H04W 24/08* (2013.01); *H04W 84/12* (2013.01); *Y02B 60/50* (2013.01)

(58) Field of Classification Search
CPC .................................................. H04W 52/0206
(Continued)

(56) References Cited

U.S. PATENT DOCUMENTS 7,519,017 B2     4/2009  Yi
2009/0296618 A1  12/2009 Wang et al.
(Continued)

FOREIGN PATENT DOCUMENTS

WO     WO2011015370      2/2011

OTHER PUBLICATIONS

IEEE standard for information technology exchange between systems local and metropolitan area networks. Specific requirements Part 11 : Wireless LAN medium Access Control (MAC) and Physical Layer (PHY) Specifications, IEEE Std 802.11-2012, Mar. 29, 2012, pp. 983-1010.
(Continued)

Primary Examiner — Shripal Khajuria
(74) Attorney, Agent, or Firm — Myers Wolin LLC (57) ABSTRACT Method for managing the power consumption in a WLAN wireless communication network, comprising an access point device for access to the wireless network and a remote station connected to the access point device. The access point transmitting control and information frames to the remote station, the method comprising the steps of insertion of at least one item of information, into at least one of the control and information frames, relating to a future period of inactivity of the access point, of deactivation of the WLAN access point and of reactivation of the WLAN access point at the end of the period of inactivity.

12 Claims, 4 Drawing Sheets (51) Int. Cl.
*H04W 24/08* (2009.01)
*H04W 84/12* (2009.01)

(58) Field of Classification Search
USPC .......................................................... 370/311
See application file for complete search history.

(56) References Cited

U.S. PATENT DOCUMENTS

| | | |
|---|---|---|
| 2010/0284316 A1 | 11/2010 | Sampathkumar |
| 2011/0069650 A1 | 3/2011 | Singh et al. |
| 2011/0158216 A1 | 6/2011 | Zaks |
| 2011/0199952 A1 | 8/2011 | Seok |
| 2012/0307702 A1* | 12/2012 | Nakae .................. H04W 48/12 370/311 |
| 2012/0327779 A1* | 12/2012 | Gell .................... H04L 47/6275 370/238 |

OTHER PUBLICATIONS

Kang et AL: "A Energy-Efficient System by Reducing Beacon Listening for Periodic Vital Sign Monitoring"Sch. of Elect.&Electron. Eng., Yonsei Univ., Seoul 2011 IEEE 54th International Midwest Symposium on Circuits and Systems (MWSCAS 2011) / 4pp./ 2011; IEEE.
Jung ETAL: "Improving IEEE 802 11 power saving mechanism"Networking Technol. Lab, Samsung Adv. Inst. of Technol., Yongin / Dept. ofElect. & Comput. Eng., Univ. of Illinois, Wireless Networks; vol. 14, No. 3; pp. 375-391; 2008; Jan. 4, 2007.
Search Report Dated Sep. 18, 2013.

\* cited by examiner

LOW POWER CONSUMPTION MODE FOR WLAN ACCESS POINT

This application claims the benefit, under 35 U.S.C. §365 of International Application PCT/EP2013/063214, filed Jun. 25, 2013, which was published in accordance with PCT Article 21(2) on Jan. 03, 2014 in English and which claims the benefit of French patent application No. 1256234, filed Jun. 29, 2012.

1. DOMAIN OF THE INVENTION

The invention relates to the domain of wireless home networks and more specifically to the reduction of power consumption of equipment participating in the implementation of these networks.

2. PRIOR ART

WLAN (Wireless Local Area Network) network technology is widely deployed in homes with access to a broadband network such as an ADSL (Asymmetric Digital Subscriber Line) link. This technology is also commonly known as WIFI (Wireless Fidelity). WLAN network technology now makes it possible, for example, to transport audiovisual programs in a WLAN-type home network and notably between a video server platform comprising a WLAN access point (decoder or home gateway, for example) and a client decoder.

An item of equipment implementing WLAN technology is considered here as being in accordance with standard IEEE802.11-2012 (IEEE Std 80211™-2012/IEEE Standard for Information technology-Telecommunications and information exchange between systems Local and metropolitan area networks-Specific requirements—Part 11: Wireless LAN Medium Access Control (MAC) and Physical Layer (PHY) Specifications).

Also, this standard IEEE802.11-2012, which specifies elements relating to the implementation of the physical layer of wireless local networks, will be called "WLAN standard" in the following paragraphs. The equipment meeting the specifications of this WLAN standard will be called "WLAN" equipment and the networks meeting these same specifications will be called "WLAN networks" in the remainder of this document.

The constraints relating to the power consumption of decoder equipment and those relating to the power consumption of home network gateways are different. The decoders must meet increasing constraints in terms of power consumption. New regulations, applicable from 2014, will impose a maximum power consumption of 4 W measured on the first part of the power supply (that is to say the mains side) for a decoder having at least one network interface adapted to be remotely activated and remaining in an inactive state (for example without implementing an application or service) for a predefined minimum time period.

This is the case, for example, for an item of equipment comprising the video server function and which includes a WLAN interface operating in AP (Access Point) mode.

The WLAN standard also specifies low power consumption standby modes also called "Power Save" modes which enable an item of WLAN equipment connected to a WLAN wireless network (which equipment is also commonly called "STA", abbreviation meaning "Station") to reduce its power consumption.

Existing low power consumption standby modes make it possible to maintain connectivity between the items of equipment but can induce an additional latency during data transmissions.

There is, however, nothing significant with a view to reducing the power consumption of the item of WLAN equipment implementing the function of access point (AP) of a WLAN network (a network gateway or an audiovisual program decoder, for example).

3. SUMMARY OF THE INVENTION

The invention enables the situation to be improved by proposing a method for implementing a low power consumption mode specific to a WLAN access point in a WLAN wireless local network.

The invention relates more specifically to a method for managing the power consumption in an item of equipment comprising a wireless local network access point device, the access point device transmitting control frames, the method comprising the steps of:
- evaluation, by a control unit of the equipment, of the quantity of data transmitted via the access point device,
- insertion into one of the control frames, according to the evaluated quantity of data transmitted, of at least one item of information relating to a future period of inactivity of the access point device,
- transmission, by the access point device, of the control frame,
- deactivation of at least one part of the access point device, and
- activation of at least one part of the access point device at the end of the period of inactivity.

According to an embodiment of the invention, the step for evaluating the quantity of data transmitted comprises a step for measuring a data bitrate.

According to an embodiment of the invention, the step for evaluating the quantity of data transmitted comprises a step for defining (or counting) a number of communication sessions in progress managed by the equipment.

According to an embodiment of the invention, the communication sessions comprise a session corresponding to a service from among the following list: television, audio broadcasting, video on demand, file download, web page broadcasting.

According to an embodiment of the invention, the control frame is a "beacon" frame such as defined by WLAN standard 802.11-2012.

According to an embodiment of the invention, the at least one item of information is inserted into the "Quiet Element" information field of a control frame such as defined in standard IEEE802.11-2012.

According to an embodiment of the invention, the start of the period of inactivity is defined by a temporal reference of the wireless local network.

According to an embodiment of the invention, the start of the period of inactivity is defined with reference to the instant of transmission of one of the control frames.

According to an embodiment of the invention, the step for evaluating the quantity of data transmitted comprises a step for analyzing the type of data transmitted.

The invention also relates to a communication device in a wireless local network, the device comprising an access point for access to the wireless local network, the device comprising:
- a controller for evaluating the quantity of data transmitted or the bitrate of the data transmitted via the access point and defining at least one period of inactivity of the access point according to the quantity of data or the bitrate of the data evaluated, a communication interface for the transmission to at least one station connected to the access point of at least one item of information relating to a future period of inactivity of the access point, a controlled switch for deactivating all or part of the communication interface during the future period of inactivity.

According to an embodiment of the invention, the switch acts on at least one current feed line of the communication interface.

According to an embodiment of the invention, the switch acts on at least one clock line connected to the communication interface.

The invention also relates to a computer program product, characterized in that it comprises program code instructions for executing the steps of the method for managing the power consumption in an item of equipment, such as described above, when the program is executed on a computer.

4. LIST OF FIGURES

The invention will be better understood, and other specific features and advantages will emerge upon reading the following description, the description making reference to the annexed drawings wherein.

5. DETAILED DESCRIPTION OF THE EMBODIMENTS OF THE INVENTION

In a general but non-restrictive way, the invention relates to a method for managing the power consumption of a WLAN access point device in a network gateway. According to the method implemented, the access point of a WLAN wireless local network notifies the connected WLAN stations of a future period of inactivity during which it will neither transmit nor receive any data and will be at least partially deactivated with a view to reducing its power consumption.

Figure 1:
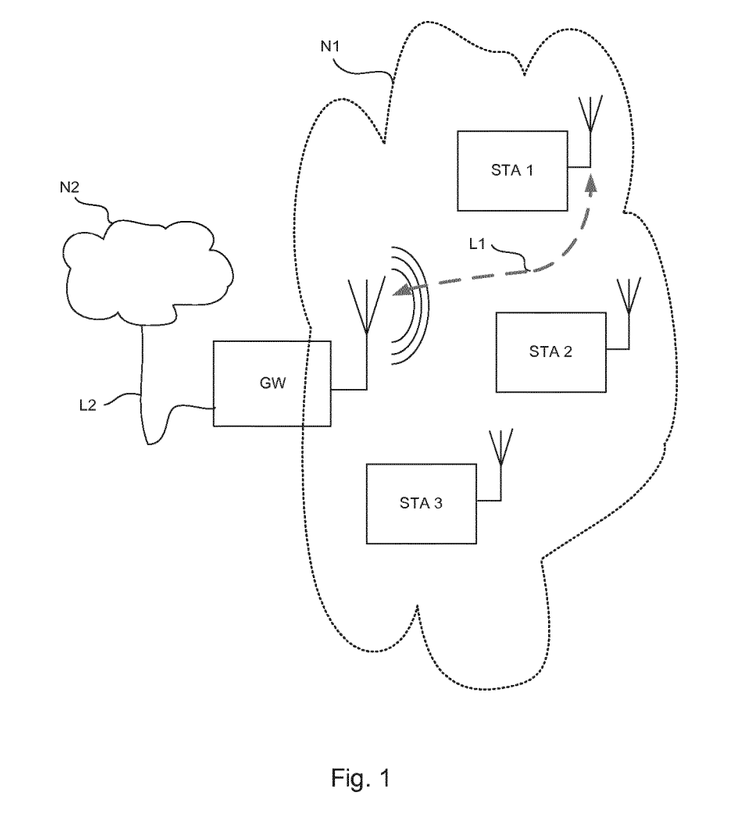
FIG. 1 shows a network gateway containing a WLAN access point in a WLAN communication network according to an embodiment of the invention.

FIG. 1 shows a communication gateway GW comprising a WLAN access point in a WLAN wireless communication network N1. WLAN network N1 also comprises three WLAN communication stations STA1, STA2 and STA3. WLAN stations STA1, STA2 and STA3 are connected to the gateway. This set of equipment constitutes a WLAN local home network. Wireless communication link L1 connecting the gateway GW to a station (STA1, for example) is a WLAN link. The gateway GW is connected to network N2 by means of a link L2. Link L2 comprises an item of equipment of DSLAM type (Digital Subscriber Line Access Multiplexer) for connection to network N2. According to the embodiment of the invention, L2 is a link of ADSL type (Asymmetric Digital Subscriber Line) and N2 is the internet network to which the gateway GW is connected by means of a WAN (Wide Area Network) broadband network. N2 comprises a plurality of servers accessible by stations STA1, STA2 and STA3 via the network gateway GW.

The gateway GW exchanges data with stations STA1, STA2 and STA3 by wireless connections according to the WLAN standard adapted according to an embodiment of the invention.

Moreover, data corresponding to the transfer of useful content between network N1 and N2, the gateway GW transmits information frames, also called control frames, to remote stations STA1, STA2 and STA3 of WLAN network N1. These frames are "beacon" frames such as defined in the WLAN standard. The "beacon" frames, sent at regular intervals, provide the characteristics of the WLAN network N1. These characteristics are for example the identifier of the network, the list of available bitrates and the supported modes and methods of identification.

According to the prior art, only remote WLAN stations (such as STA1, STA2 and STA3 in the case of network N1) can be configured in a low power consumption mode, notably by deactivating their radio frequency transmission-reception modules.

According to an embodiment of the invention, the gateway GW executes a software routine aiming to define instants of entering and exiting low power consumption mode according to predefined conditions. These conditions are, for example, the frequency of exchanges with stations STA1, STA2 and STA3 and the type of data transmitted. For example, in the absence of video stream reception, and if the transmission of useful data does not exceed a predefined bandwidth occupancy on network N2, the algorithm being executed in the gateway GW (whose steps are executed by the control unit of the gateway) configures the WLAN access point of the gateway GW to low power consumption mode.

According to the embodiment of the invention, the low power consumption mode corresponds to an alternation of periods of activity and periods of inactivity of the WLAN access point module of the gateway GW.

When the gateway is in low power consumption mode, it regularly deactivates, for periods known as periods of inactivity, its WLAN access point module, after notifying the set of connected equipment (remote stations STA1, STA2 and STA3), by inserting an item of information into an information field of a "beacon" control frame.

The gateway indicates, for example, in the information field that it will deactivate its WLAN access point module 10 ms after transmission of the "beacon" frame until the following "beacon" frame is sent. According to the embodiment, the "beacon" frames are sent by the gateway GW at regular intervals, every 100 ms.

Thus, 10 ms after providing notification of a period of inactivity of its WLAN access point, the gateway deactivates its WLAN access point and will only reactivate it 90 ms after. During this period of inactivity, the gateway transmits nothing more via its WLAN access point module and cannot receive frames from stations STA1, STA2 and STA3. This is not, however, detrimental to the data exchanges on network N1 since the stations have received a notification of a future period of inactivity in a "beacon" frame and send no more frames to the gateway GW for the entire duration of the period of inactivity.

According to this example, the WLAN access point of the gateway GW is partially or completely deactivated for 90% of the time when the gateway is configured to low power consumption mode. The deactivation of the WLAN access point makes it possible to save power due to the total or partial absence of power consumption.

According to the embodiment, the communication interfaces of stations STA1, STA2 and STA3 of network N1 are also deactivated for the periods of inactivity of the low power consumption mode. The stations, after receiving the information providing notification of a future period of inactivity, transmitted from the WLAN access point of the gateway GW, in a "beacon" frame, also position themselves in low power consumption mode by configuring their interfaces so as to consequently reduce their power consumption. The low power consumption mode of the stations is configured for each of the stations by its onboard control unit (comprising a microcontroller and associated onboard software).

Advantageously, the power consumption of all interconnected WLAN equipment of the network is thus reduced simply by notification of periods of inactivity of the WLAN access point of the gateway GW.

Figure 2:
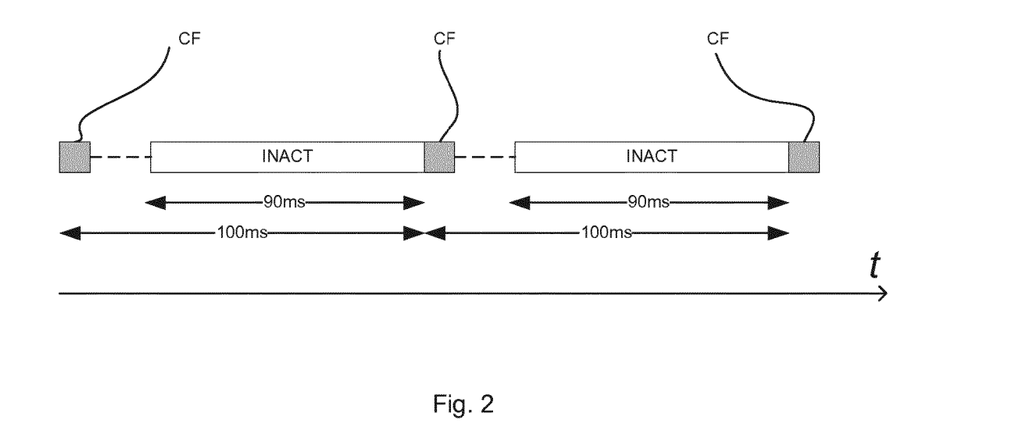
FIG. 2 shows an alternation of periods of activity and inactivity of the WLAN access point of the network gateway of FIG. 1.

FIG. 2 shows a sequencing of periods of activity and periods of inactivity INACT of the WLAN access point WLAN-AP of the network gateway GW. The WLAN access point transmits "beacon" frames CF every 100 ms. The WLAN access point of the gateway GW is configured to low power consumption mode. The "beacon" frames CF comprise information relating to the periods of inactivity INACT.

The items of information INF relating to the periods of inactivity indicate to the stations connected to the WLAN network N1 that the gateway will deactivate its WLAN access point at the end of a period of 10 ms, which period begins from the start of the next "beacon" information frame CF. The items of information INF comprise a notification indicating that the periods of inactivity thus notified are to be considered for each of the periods delimited by two successive "beacon" frames CF. Thus, the WLAN access point WLAN-AP of the network gateway GW is deactivated 90% of the time for the entire duration of the low power consumption mode.

Figure 4:
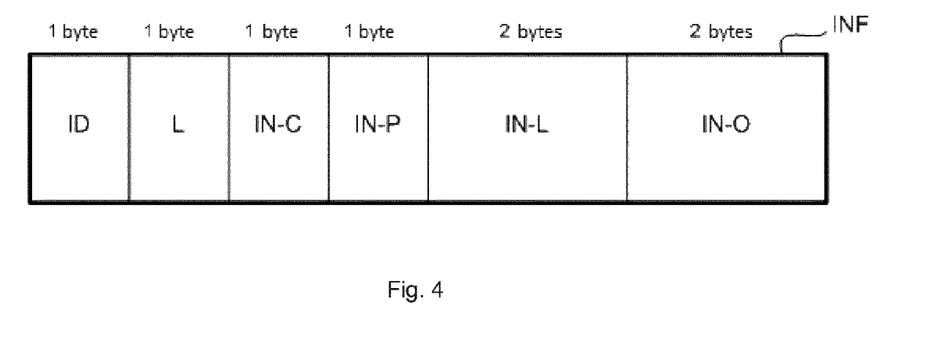
FIG. 4 shows an information field transmitted by the WLAN access point of the gateway of FIG. 1 to the connected stations with a view to providing notification of a future period of inactivity of the WLAN access point.

FIG. 4 shows the elements of information inserted into a "beacon" control frame CF and transmitted on network N1 by the gateway GW. According to the embodiment of the invention, the "Quiet" information field defined in the WLAN standard is used for the transmission of information related to future periods of inactivity. The set of information is called INF. The information field INF comprises a header and four indicators. The header comprises a field identifier ID and an item of field length information L. L indicates the length in bytes of the field including the header and length bytes. Indicator IN-C indicates the number of future "beacon" frames, preceding the start of the next period of inactivity. Indicator IN-P indicates, when its value is non-zero, the number of "beacon" frames separating two successive periods of inactivity. If the value of indicator IN-P is zero, this indicates that there is no future period of inactivity following the next notified period of inactivity. Indicator IN-L serves to describe a periodic succession of periods of inactivity. If the value is zero, there is no periodicity of periods of inactivity. If the value is non-zero, it indicates the number of "beacon" frames separating two periods of inactivity. Indicator IN-O makes it possible to offset the start of a period of inactivity with respect to a "beacon" information frame. In other words, a period of inactivity does not necessarily correspond to one or more intervals between two "beacon" frames; the IN-O indicator therefore indicates a number of units of time separating the start of a "beacon" frame and the start of the period of inactivity to follow.

Figure 3:
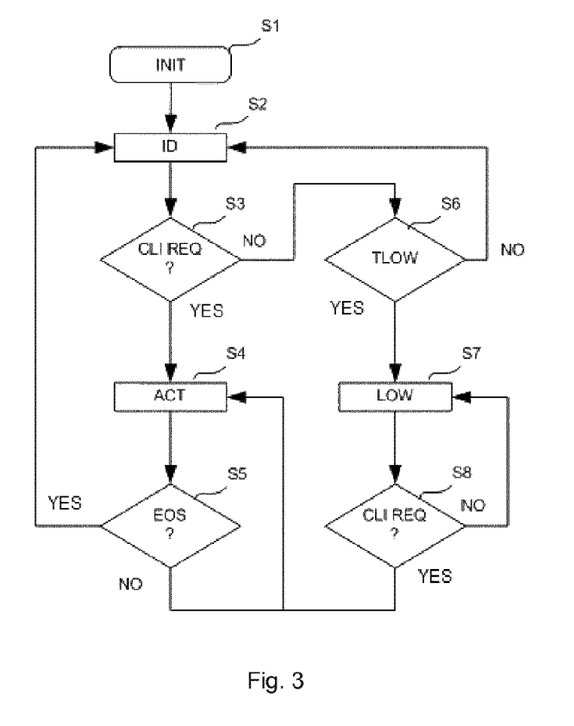
FIG. 3 shows a method for managing the power consumption of the WLAN access point of the gateway of FIG. 1.

FIG. 3 is a diagram showing an algorithm implemented by the control unit of the network gateway GW. This diagram describes the different steps of the routine for managing the low power consumption mode of the WLAN access point of the gateway GW. It describes the conditions (events and/or actions) resulting in the entering or exiting of the low power consumption mode of the WLAN access point of the gateway GW.

Step S1 is a step for initializing the gateway GW. This step follows power-up. The set of modules of the gateway are configured with a view to its nominal operation, notably the control unit, the WLAN access point and an internal routing module.

According to the embodiment of the invention, the gateway GW configures the WLAN access point to low power consumption mode when the number of packets transiting corresponds to a low occupancy of the available bandwidth. For example, in the absence of transfer of data related to the transmission of an item of audiovisual content, the gateway GW positions the WLAN access point in low power consumption mode. During the transfer of data corresponding to a telephone communication of VOIP type (Voice Over IP), it is also possible, in the case of data transiting in "burst" mode, to configure the WLAN access point to low power consumption mode when the periods of inactivity are sufficient to guarantee the bitrate necessary for the VOIP telephony session in progress. More generally, the access point can be configured to low power consumption mode when the remaining periods of activity make it possible to guarantee the transfer of data transiting by the gateway GW. With regard to the transfer of audiovisual content, the detection in the gateway GW, by the routine for managing the low power consumption mode of the WLAN access point, of a request aiming to access an item of audiovisual content, leads to the exiting of the low power consumption mode or the modification of the ratio between the periods of activity and the periods of inactivity. In fact, during the transfer of an item of audiovisual content via the gateway GW, the quantity of useful data is significant and it is necessary to maintain periods of activity sufficiently long to guarantee the transfer of all of the data.

In the context previously described, and according to a variant embodiment, "low power consumption mode" can be understood to be either a mode defined by the mere presence of periods of inactivity of the WLAN access point, or a mode defined by exceeding a ratio (or threshold) between the periods of activity and periods of inactivity of the WLAN access point. Regardless of the definition of low power consumption mode, the more frequent (and/or long) the periods of inactivity of the WLAN access point, the longer the time during which all or part of the WLAN access point is not powered, thus saving power as a result.

In step S2, the gateway GW performs the transfers of data which arise on one or other of its network interfaces (WAN or WLAN), without, however, a request for access to an item of audiovisual content transmitted by one of stations STA1, STA2 or STA3 being detected. This corresponds to an operational mode ID (from IDLE) where nothing happens from the point of view of a transfer of audiovisual content.

In step S3, the management routine tests if a request for access to an item of audiovisual content was transmitted by one of stations STA1, STA2 or STA3, to a remote server (located on network N2). Such a request is called CLI REQ (client request). If no client request was detected by the routine for managing the low power consumption mode of the gateway, a time counter is initiated in step S6, at the end of which, still in the absence of a request for access to an item of audiovisual content, the gateway GW will enter low power consumption mode. The low power consumption mode LOW corresponds to step S7. In step S6, as long as the time predefined by a time counter TLOW is not reached, the routine returns to step S2 and the gateway manages the transit of the data which arise. If the predefined time is reached, the WLAN access point is configured to low power consumption mode in step S7. The low power consumption mode is maintained as long as there is not client request aiming to access an item of audiovisual content via the gateway network GW (steps S7 and S8). If in step S8 a client request from a station is detected, the gateway GW deactivates the low power consumption mode LOW of the WLAN access point implemented in step S7 and configures the WLAN access point to an active mode ACT, in step S4. In this active mode ACT, the data stream transiting by the gateway comprises data corresponding to the transfer of one or more items of audiovisual content.

When the transmission of audiovisual content is complete, the management routine detects the end EOS (End of Service) of the transmission in step S5 and returns to step S2.

According to a variant, the routine (or algorithm) for managing entry into low power consumption mode of the WLAN access point and exit from this mode comprises a step for detecting an action of the user enabling entry into low power consumption mode of the access point to be forced. This step is, for example, pressing a configuration key of the network gateway GW. The key can be dedicated to this use or shared with one or more other functions of the network gateway GW.

Figure 5:
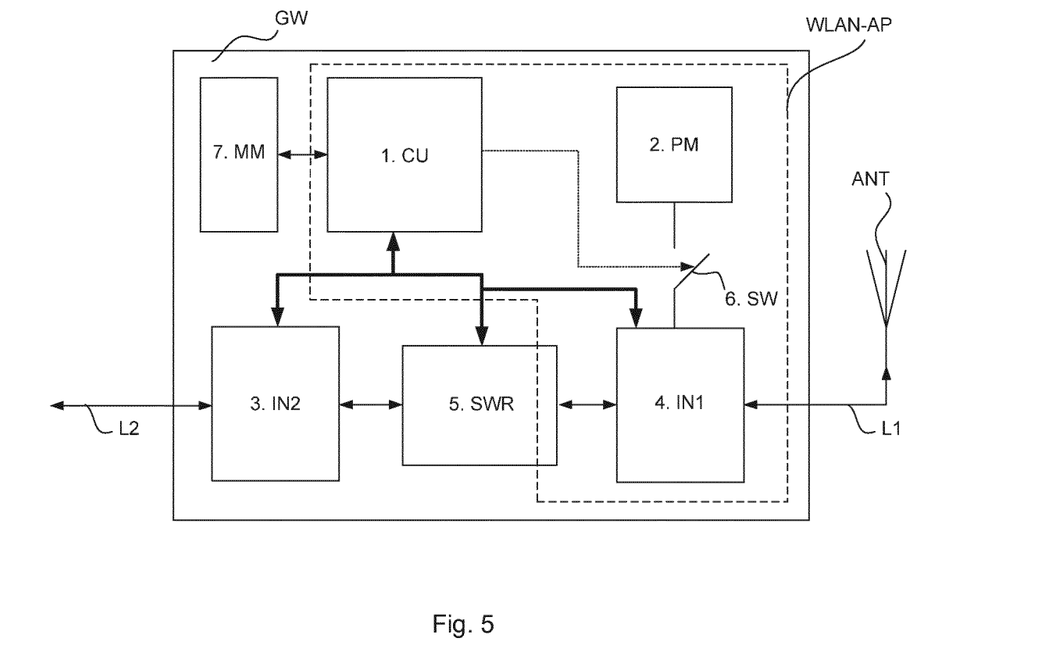
FIG. 5 shows an internal architecture of the gateway comprising a WLAN access point of FIG. 1.

FIG. 5 shows the internal architecture of the network gateway GW comprising a WLAN access point WLAN-AP. The gateway comprises a network interface IN2 3 for connection to a broadband network of WAN type (giving access to the internet) via the ADSL link L2 and a network interface IN1 4, of WLAN type. Network interface IN1 and the control unit CU 1 implementing, amongst other things, the control of network interface IN1, constitute the WLAN access point of the gateway GW.

The connection between the gateway GW and remote stations STA1, ST2 and ST3 uses an antenna ANT which can be internal or external to the network gateway GW and which corresponds to link L1 in the figure. The routing of data between the WAN and WLAN network interfaces, that is to say between IN2 and IN1 respectively, is realized by a routing module SWR 5. The routing module SWR 5 directs the data frames received on interface IN2 3 and intended for the connected stations to the WLAN interface IN1 4 and vice versa.

The control and the configuration of the different modules of the gateway GW is realized by the control unit CU 1 which, coupled to the memory module MM 7, comprises a microcontroller and all elements useful for executing onboard software routines. The details of the control unit CU 1 are not described here, being well known to those skilled in the art. The control unit CU 1 executes the routine for managing the low power consumption mode LOW of the WLAN access point of the gateway GW. Wireless network interface IN1 4 is a WLAN transmission-reception module which is powered by a power module PM 2, via a controllable switch SW 6 connected to a control port of the control unit CU 1. Thus, when the management routine configures the WLAN access point of the gateway GW to low power consumption mode LOW, there appears an alternation of periods of activity and periods of inactivity of the WLAN access point. During a period of inactivity, the control port of the control unit CU 1 is positioned so that the switch SW 6 is open and a part at least of the WLAN access point is no longer powered by the power module PM 2. The power consumption of the access point (and therefore of the gateway GW) is thus lower. During periods of activity of the WLAN access point, the control port of the control unit CU 1 is positioned such that the switch SW 6 is closed and that the set of elements which constitute network interface IN1 4 of the access point WLAN-AP, powered by the module PM2 is switched on.

According to a variant, all or part of network interface IN1 4 is deactivated not by a controlled switch-off but by a deactivation of one or more clocks useful for the operation of the WLAN access point of the gateway GW.

In other words, and according to the embodiment of the invention, the routine executed by the control unit CU 1 of the network gateway GW implements a method for managing the power consumption of the WLAN access point of the gateway GW, in the WLAN network comprising the gateway GW and stations STA1, STA2 and STA3. The gateway network GW comprises the WLAN access point and transmits control frames and information to the remote stations connected to the WLAN network. The method for managing the power consumption of the WLAN access point of the gateway comprises the following steps:

evaluation, by the control unit CU 1 of the gateway, of a bitrate of the data transmitted via WLAN interface IN1; this step being able to include the analysis of the type of data transiting (for example audio, video, dated related to a telephony session), insertion into one or more "beacon" frames defined by the WLAN standard, by the control unit of the gateway GW, of information relating to a future period of inactivity of the access point of the gateway on WLAN local network N1, total or partial deactivation of communication interface IN1 4, reactivation of communication interface IN1 4 at the end of the period of inactivity.

According to this management method, the power consumption of the gateway GW in low power consumption mode LOW is lower than its power consumption in active mode ACT (see FIG. 3).

Figure 6:
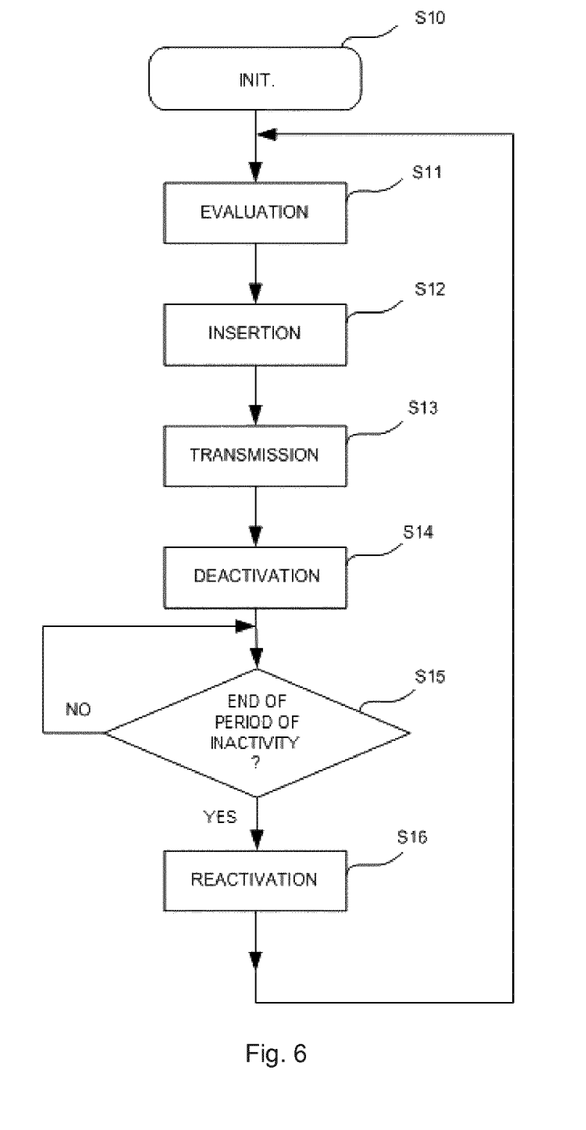
FIG. 6 is a diagram showing the method for defining and providing notification of a period of WLAN access inactivity of the gateway GW of FIG. 1.

FIG. 6 shows the steps for implementing the low power consumption mode LOW of the method for managing the power consumption in the gateway GW which comprises the access point device WLAN-AP of the WLAN wireless local network N1. The access point WLAN-AP transmits "beacon" control frames CF. More specifically, the method comprises steps of:

evaluation by the control unit CU1 of the gateway GW, of the bitrate of data transmitted via the access point WLAN-AP, insertion into one of the "beacon" control frames CF, according to the bitrate determined, of at least one item of information INF relating to a period of inactivity INACT of the access point WLAN-AP, transmission, by the access point WLAN-AP, of the control frame comprising the item of information INF, deactivation of WLAN network interface IN1 of the access point WLAN-AP, and activation of WLAN network interface IN1 of the access point WLAN-AP at the end of said period of inactivity INACT.

Step S10 corresponds to the nominal operation of the gateway, in active mode ACT. No period of inactivity of the access point WLAN-AP has yet been defined. The exchanges of data are operational via the gateway GW. In step S11, the control unit evaluates the useful bitrate of the data transiting. The evaluation of the useful bitrate is made, for example, by counting the number of bytes transmitted between networks N2 and N1 via the router SWR 5 of the gateway GW. According to a variant embodiment, the evaluation of the bitrate includes an analysis step associating a predetermined theoretical bitrate according to the type of data transiting. For example, the analysis step consists in the detection in the data transiting of information indicating the transmission of an item of audiovisual content, or even the resolution of the images carried in the audiovisual stream and the type of coding used. The routine for managing the low power consumption mode determines a useful bitrate according to these elements and defines one or more periods of inactivity of the access point WLAN-AP in network N1. In step S12, the item or items of information aiming to provide notification of the future period or periods of inactivity are inserted into one of the "beacon" control frames CF regularly transmitted on network N1 by the control unit CU 1 and network interface IN1. In step S13, network interface IN1 transmits on network N1 the "beacon" control frame CF containing the item or items of information, intended for the stations connected to the access point WLAN-AP, via network N1. In step S14, and at the moment corresponding to that which is notified by the item or items of information inserted and transmitted, the control unit CU 1 of the gateway deactivates all or part of network interface IN1 for the entire duration of the period of inactivity defined in step S11. The control unit then waits for the end of the period of inactivity, by counting the time since the deactivation, to reactivate network interface IN1. The control unit then performs a return to step S11 with a view to determining the next future period of inactivity or the next series of future periods of inactivity.

Advantageously, the communication interfaces of connected stations STA1, STA2 and STA3 are deactivated for the periods of inactivity defined by the network gateway GW (or by the routine for managing its power consumption).

According to a variant, the start of the future period of inactivity is defined according to a temporal reference common to the gateway GW and stations STA1, STA2 and STA3. This reference is, for example, the reference clock of WLAN network N1.

According to a variant embodiment, the method for managing the power consumption in the network gateway GW comprising the access point device WLAN-AP of the wireless local network N1 comprises a step for evaluating the quantity of data transiting by the gateway GW, which step is different from a measurement of bitrate in the sense of the number of data transmitted during a time interval.

For example and according to this variant, the step for evaluating the quantity of data, by the control unit CU 1 of the gateway GW, consists in defining the number of services in progress (or active services) available for the user. The term service can mean here a communication session in progress enabling the transmission of data corresponding to this service. A service available for the user, thus defined, is for example the reception of a television program, the reception of web pages, the reception of one or more items of content during a download session, a video-on-demand session or a session for broadcasting one or more pieces of music. Thus and according to this variant, the control unit analyzes the data streams transferred via the routing module SWR 5 and/or the access point device WLAN-AP and increments a session counter for service in progress at each detection of transferred data corresponding to a new service (or more specifically to a newly activated service). According to this variant, when the value of the session counter for services in progress is equal to zero, and when there is therefore no service in progress available to the user (requested by the user or not), the control unit CU 1 of the gateway GW configures the gateway to low power consumption mode LOW. When the number of service sessions in progress is zero, the low power consumption mode LOW is activated immediately or after a time delay of a predetermined duration (several minutes, for example). According to this variant embodiment, the insertion into at least one of the control frames CF of at least one item of information INF relating to a future period of inactivity INACT of the access point device WLAN-AP, depends on the number of service sessions in progress and/or the time elapsed since the end of the last service session.

The invention does not apply solely to the embodiment described above but relates to any system enabling, in an item of equipment comprising a WLAN access point connected to a WLAN network, one or more stations connected to the WLAN network to be notified of a future period of inactivity of the access point WLAN-AP on a WLAN network, during which period all or part of the network interface of the WLAN access point is deactivated with a view to reducing its power consumption (and therefore the power consumption of the equipment).

According to a variant, an item of information INF relating to a future period of inactivity of the WLAN access point of the network gateway GW is inserted into a new information field, entirely dedicated to this use, and defined in an adaptation of the existing WLAN standard.

According to another variant, the user can configure a ratio between the periods of activity and the periods of inactivity of the low power consumption mode, consequently imposing a limit on the useful data, but enabling the user to reduce the power consumption of the WLAN access point, and consequently of the network gateway GW. To do this, the user uses for example configuration fields which are accessible to him in a "configuration page" of the gateway GW. The user connects to the configuration page on an available port of the routing module SWR 5 or via one of remote stations STA1, STA2 or STA3. The configuration page is generated by the control unit CU 1 of the gateway GW by means, for example, of a web server which uses an HTTP (Hypertext Transfer Protocol) protocol. The user configures for example a ratio between the periods of activity and the periods of inactivity, either as a percentage, or by defining a maximum bitrate value of the data transiting by the access point of the gateway. The control unit reads the configuration parameters thus entered by the user and positions them in the registers accessible to the management routine of the low power consumption mode.

The invention claimed is:

1. A method for managing power consumption in a device comprising a wireless local network access point device, said access point device transmitting control frames at regular times, wherein the method comprises:

evaluating a quantity of data transmitted and/or received by said wireless local network access point device, said evaluating delivering an evaluated quantity of data, broadcasting, by said access point device, one of said control frames comprising at least one item of information from which a future period of inactivity of said access point device can be obtained, said period of inactivity being a period during which said access point device does not transmit on said wireless local network and processes no data from a station communicatively connected to said wireless local network, wherein said period of inactivity is a time period that is just before a time period dedicated to a broadcasting of next control frame at regular times, and wherein a duration of said period of inactivity of said access point device is defined according to said evaluated quantity of data, and wherein a ratio between an active period and the period of inactivity that are comprised between two regular emitted control frames is not the same, deactivating at least one part of said access point device, and activating said at least one part of said access point device at the end of said period of inactivity.

2. The method according to claim 1, wherein said at least one deactivated then reactivated part of said access point device comprises a module for transmission of radio frequency waves.

3. The method according to claim 1 wherein the evaluating of the quantity of data transmitted comprises a measurement of a data bitrate.

4. The method according to claim 1 wherein the evaluating of the quantity of data transmitted comprises a definition of a number of communication sessions in progress.

5. The method according to claim 4 wherein said sessions comprise a session corresponding to a service from among the following list: television, audio broadcasting, video on demand, file download, web page broadcasting.

6. The method according to claim 1, wherein said control frame is a "beacon" frame such as defined by WLAN standard 802.11-2012.

7. The method according to claim 1, wherein said at least one item of information is inserted into the "Quiet Element" information field of a control frame such as defined in standard IEEE 802.11-2012.

8. The method according to claim 1, wherein evaluating the quantity of data transmitted comprises analysis of the type of data transmitted.

9. A computer and non-transient storage medium storing a computer program comprising a set of computer-executable instructions to implement a method for managing power consumption in a device when the instructions are executed by a computer, wherein the instructions comprise instructions, which when executed, configure the computer to perform a method of claim 1.

10. A device for communication in a wireless local network, said device comprising an access point for access to said wireless local network, wherein said device comprises a memory and at least one processor, said at least one processor being coupled to said memory, and said at least one processor being configured to:

transmit control frames at regular times, determine a duration of a future period of inactivity of said access point based on evaluated quantity of data transmitted and/or received by said access point, broadcast to at least two stations communicatively connected to said access point at least one item of information comprising said duration of a future period of inactivity, wherein said future period of inactivity is a time period that is just before a time period dedicated to a broadcasting of next control frame at regular times, and wherein a ratio between an active period and the period of inactivity that are comprised between two regular emitted control frames is not the same, and deactivate all or part of said communication interface during said future period of inactivity.

11. The device according to claim 10 wherein said at least one processor is configured to act on at least one current feed line of said communication interface.

12. The device according to claim 10 wherein said at least one processor is configured to act on at least one clock line connected to said communication interface.

* * * * *